United States Patent [19]
Zukerman et al.

[11] Patent Number: 5,817,355
[45] Date of Patent: Oct. 6, 1998

[54] SHELF STABLE SHAPED GRAIN PRODUCTS

[75] Inventors: Harold W. Zukerman; Rachel B. Zukerman, both of Northbrook, Ill.

[73] Assignee: Healthy Grainfoods L.L.C., Northbrook, Ill.

[21] Appl. No.: 709,305

[22] Filed: Sep. 9, 1996

[51] Int. Cl.⁶ .............................. A23P 1/10; A23L 1/10; A23L 1/182; A23L 3/34
[52] U.S. Cl. ................ 426/272; 426/618; 426/452; 426/512; 426/518; 426/532; 426/808
[58] Field of Search ........................ 426/272, 618, 426/452, 512, 532, 518, 808

[56] References Cited

U.S. PATENT DOCUMENTS

| | | | |
|---|---|---|---|
| 3,711,295 | 1/1973 | Zukerman | 99/80 |
| 4,800,099 | 1/1989 | Gellman | 426/641 |
| 5,137,745 | 8/1992 | Zukerman et al. | 426/618 |
| 5,624,697 | 4/1997 | Lin et al. | 426/241 |

*Primary Examiner*—Michael P. Woodward
*Assistant Examiner*—Mary K. Zeman

[57] ABSTRACT

This invention relates to a process for making shelf stable, shaped grain products, whose textures are comprised of visible, fully-cooked cereal grains joined together, and having said grains filled with a water solution containing soluble solids and an antimycotic agent. In the process of the present invention, whole cereal grains such as rice, oats, wheat, or other cereal grains are modified by either flattening the grains with cereal flaking rolls, creating small internal cracks in the grain structure, or cutting the grains into smaller pieces. The cereal grains are then cooked in a water solution with soluble solids and an antimycotic agent at temperatures over 190 F. Binders, such as starch, gums, or pectin are added to either gel the mixture or develop cohesive surfaced grains that become joined together. The cooked cereal grains which are now joined together, are formed into shapes with low shear forming equipment and heated and dried with an oven or hot air until their water activity falls below 0.85.

10 Claims, No Drawings

SHELF STABLE SHAPED GRAIN PRODUCTS

BACKGROUND OF THE INVENTION

Shaped rice and grain products are discussed in several prior art patents: U.S. Pat No. 3,711,295; U.S. Pat No. 3,961,087; U.S. Pat. No. 4,764,390; U.S. Pat. No. 5,137,745; and U.S. Pat. No. 5,525,366. The products made from the processes taught in these prior art patents discuss how to make shaped grain products that are stored frozen, whereas the products made from the process of the present invention are shelf stable and can be stored at prevailing room temperature conditions. They do not have to be stored frozen.

The process for making shelf stable granola bars has been taught in U.S. Pat. No. 4,451,488. Dry granola cereal mix containing oat and wheat flakes, rice, almonds, peanuts, coconut, raisins, etc are blended together with a binder comprised of sugars, glycerin, sorbitol, and corn syrup. The entire mixture of blended ingredients is then poured into a forming mold where it is pressed to the desired size and density and cut into bars.

The prior art also teaches how to make shelf stable bars from puffed rice grains or puffed extruded rice pieces that are about the size of rice grains. This process is similar to the granola bar process, i.e. the dry, puffed, cereal pieces are blended together with a binder solution or a marshmallow mixture, poured into a forming mold, pressed to the desired size and density, and cut into bars.

The prior art also teaches how to make intermediate moisture food bars and pet food products having water activity below 0.85 and an antimycotic agent to prevent yeast and mold growth. These products are made by first milling the cereal grains into a fine powder which is then blended with water and formed or expanded into food or pet food products that have "homogeneous consistency" textures.

The prior art patents do not teach how to make shelf stable, shaped grain products whose textures are comprised of visible, fully-cooked cereal grains joined together, and having said grains filled with a water solution containing soluble solids and an antimycotic agent. This process is taught in the present invention.

BRIEF SUMMARY OF THE INVENTION

It is an object of the present invention to provide shelf stable, rice bars and cakes having textures comprised of visible, water-cooked rice grains joined together.

It is another object of the present invention to provide shelf stable, fruit flavored oatmeal bars and cakes having textures comprised of visible, water-cooked oat grains joined together.

It is another object of the present invention to provide shelf stable, mixed grain cups having textures comprised of cooked cereal grains from two or more different grain genera.

DETAILED DESCRIPTION OF THE PREFERRED EMBODIMENT

The present invention relates to a process for making shelf stable shaped grain products whose textures are comprised of visible, fully cooked cereal grains joined together and having said cereal grains filled with a water solution containing soluble solids and an antimycotic agent. More particularly, it is directed to a cereal grain food product that does not need to be stored refrigerated or frozen. It can be stored at room temperature conditions.

In the process of the present invention, the shaped grain products can be made with cereal grains, selected from the group consisting of oats, wheat, white rice, brown rice, wild rice, corn, barley, buckwheat, and combinations thereof. The whole cereal grains can be modified before they are cooked so during the subsequent cooking procedure, the centers of the grains will more easily absorb both the cooking water and the higher levels of soluble solids. The grains can be modified by either flattening them with cereal flaking rolls, creating small internal cracks in the grain structure, or cutting the grains into smaller pieces. The type of modification required depends on the grains. Rice grains can be modified by either, cutting them into smaller pieces, or by rapidly heating and then immediately rapidly cooling the whole grains to create small internal stress cracks in the grains' structure. Oat grains and wheat grains are modified by either cutting the grains into smaller pieces or by flattening the whole grain with cereal flaking rolls.

The grains are modified in order to facilitate the absorption of the soluble solids and cooking water solution into the grains' interiors. Modified whole grain rice cooks faster because during the cooking cycle, the water containing the soluble solids moves via the small internal cracks to the centers of the rice grains. Because flattened oat and wheat flakes are thin and have larger surface areas, as they cook they more rapidly absorb the soluble solids.

The modified cereal grains are cooked with water, and/or steam at temperatures over 190 F. in a tilt steam jacketed kettle equipped with scraper agitators that mix the grains and the cooking water without shearing the grains as the water and soluble solids are infused or absorbed into the grains' structure.

Modified cereal grains can be cooked and infused with sufficient soluble solids by several methods. In one method, the modified grains are cooked with a soluble solids cooking water that has a water activity reading of about 0.90. The water activity of the cooking water is maintained at about 0.90 throughout the cooking operation because our tests have shown that when water activity readings are lower than about 0.85, the grains will only absorb a small amount of the 0.85 cooking water leaving the soluble solids unabsorbed and outside the grains while the grain centers still remain uncooked. Our tests have also shown that water and soluble solids solutions having about 0.9 or higher water activities produce fully cooked cereal grains having centers that are infused with the proper amount of soluble solids.

A second method uses modified cereal grains that are pre-coated with glycerin, a good source of soluble solids. The glycerin is pre-coated onto the modified cereal grains in a mixer such as a Hobart Mixer with a paddle agitator. The glycerin coated modified cereal grains are cooked in a steam jacketed tilt kettle with scraper agitators that gently mix the grains during the cooking operation. The grains are cooked at 200 F. in a cooking water solution having a water activity of about 0.90.

In this procedure, because the glycerin which contributes a large portion of the soluble solids is already in the grains, less added water is required to maintain a cooking water solution having a 0.90 water activity. Since less water is added to the cooking water, less water has to be evaporated from the units when they are dried to a water activity less than 0.85.

The grains can also be cooked with an antimycotic agent such as sorbic acid, benzoic acid, or their salts. Starch complexing agents, binders such as starch, pectin or gums, flavors, lecithin, food particles, herbs, spices, and shelf stable natural food and pasta pieces, and combinations thereof can also be added to the cooking water.

The starch complexing agents and the lecithin are added to the cooking water before the grains are added so they can provide emulsification and/or complex the starch in the grains during cooking. The binders, pre-blended with the flavor and sugar, are added to the cooked grains at the end of the cooking operation when the grain centers are already cooked, and have absorbed the cooking water. Binders, such as starch, gums, or pectin are added to form gels or develop cohesive surfaced grains that become joined to one another.

After the grains are cooked and infused with the soluble solids, they are dumped from the cooker while the mixture is still fluid. If the hot cooked grains are not used within a relatively short period of time, they can be cooled and used later. Cooling is conducted in a manner that will not increase the water activity of the grains.

The shelf stable hot cereal grains can also be dispersed together with other shelf stable food particles, such as diced fruit or vegetables, before the grains are formed into units.

The cooked cereal grains that are infused with the absorbed soluble solids and antimycotic agent, can then be formed into any shape with low shear formers that are well known in the art.

The shaped units can be used without further processing if their water activity is below 0.85 and they have about 0.2%–0.4% antimycotic agent. Otherwise, the units are then baked or heated with hot air to both firm their texture and evaporate sufficient water which concentrates the remaining soluble solids within the grains' structure and reduces their water activity to below 0.85 and concentrates the antimycotic agent to 0.2%–0.4%.

Example 1 teaches how to make shelf stable rice bars flavored with herbs and spices. Example 2 teaches how to make shelf stable fruit flavored oatmeal bars.

EXAMPLE 1

Shelf Stable Rice Bars

This example describes the preparation of a shelf stable rice bar flavored with herbs and spices. In this process, white rice grains are modified by first heating the grains and then rapidly cooling them to create stress cracks in the grains' structure.

The modified grains are then cooked at 200 F. in a solution containing the soluble solids and potassium sorbate. Additional water is added if the water activity of the solution is lower than about 0.85. It is preferred to cook the grains in a soluble solids cooking water solution having a water activity of about 0.90. At the end of the cooking operation, when just about all the liquid has been absorbed into the grains, the binders are added. The binders produce cohesive surfaced grains that become joined together. The grains are then formed into bars with low shear formers while still retaining their texture of visible water cooked rice grains joined together. The units are then dried in a convection oven until their water activity falls below 0.85.

The ingredients added to the cookers are:

| INGREDIENTS | PERCENT |
| --- | --- |
| White Rice | 17.6 |
| Water | 50.0 |
| Sucrose | 22.0 |

-continued

| INGREDIENTS | PERCENT |
| --- | --- |
| Glycerin | 7.0 |
| Binders | 1.1 |
| Salt | 1.1 |
| Herbs and Spices | 0.7 |
| Potassium Sorbate | 0.3 |
| Monoglycerides | 0.2 |
| Total | 100.00 |

Note: The finished product has a 38% moisture content and a 0.84 water activity.

EXAMPLE 2

Shelf Stable Fruit Flavored Oatmeal Bars

This example describes the preparation of a shelf stable oatmeal bar. In this process, the oat grains are modified by flattening the grains with cereal flaking rolls to produce flakes that are about 0.035 inches thick. The flakes are then uniformly coated with the glycerin in a Hobart Mixer with paddle attachment.

The glycerin coated modified grains are cooked at about 200 F. in a water solution containing the remainder of the soluble solids and potassium sorbate. Additional water is added to the cooking water solution if its water activity is lower than about 0.85. It is preferred to cook the grains in a cooking water having a water activity of about 0.90. At the end of the cooking operation, when just about all of the liquid has been absorbed into the grains, the binders are added to produce cohesive surfaced grains that become joined together. These grains are then formed into continuous slabs with low shear formers that retain the visible oat grain texture. The slabs are then cut into units with a guillotine cutter and dried in a convection oven until their water activity falls below 0.85.

The ingredients added to the cookers were:

| INGREDIENTS | PERCENT |
| --- | --- |
| Oats | 21.5 |
| Water | 44.0 |
| Sucrose | 23.5 |
| Glycerin | 7.0 |
| Salt | 1.1 |
| Binders | 2.0 |
| Flavor | 0.6 |
| Potassium Sorbate | 0.3 |
| TOTAL | 100.00 |

Note: The finished product has a 0.84 water activity and a 37% moisture.

It is understood that the above described process and the above examples are simply illustrative of the application of principles of the invention and many other modifications may be made without departing from the spirit and scope of the invention.

The embodiments of the invention in which an exclusive property or privilege is claimed are defined as follows:

1. A process for making shaped grain products comprised of: whole or pieces of soft and wet, cooked cereal grains joined together and microbiologically stable when stored at room temperature, said process comprising the steps of:

a) modifying whole cereal grains;

b) enrobing glycerin onto the modified grains;

c) cooking the grains of b) at temperatures above 190 F. with a concentrated soluble solids solution and an anti-mycotic agent until said grains' interiors become soft and wet;

d) forming the soft and wet grains of c) into shaped units with low shear forming equipment; and e) partially drying the shaped units of d) to a water activity below 0.85.

2. The process of claim 1 wherein the cereal grains are selected from the group consisting of oats, wheat, white rice, brown rice, wild rice, corn, barley, buckwheat, and combinations thereof.

3. The process of claim 2 wherein whole cereal grains are modified by flattening them into thick flakes with cereal flaking rolls.

4. The process of claim 2 wherein whole cereal grains are modified by cutting them into smaller but distinct pieces with a steel cutter.

5. The process of claim 2 wherein whole cereal grains are modified by creating small cracks in their structure.

6. The process of claim 1 which further comprises adding a binder selected from the group consisting of starch, gums, and pectin to the cooked grains before said grains are formed into shaped units.

7. The process of claim 1 which further comprises adding to the concentrated soluble solution ingredients selected from the group, consisting of: flavors, herbs, milk solids, shelf stable natural and fabricated food pieces, binders, gums, starches, starch complexing agents and combinations thereof.

8. The process of claim 1 where the whole or pieces of cooked cereal grains infused with the concentrated soluble solids solution and anti-mycotic agent are formed into rectangular, bar, cylindrical, tubular, or cup shaped units with low shear forming equipment.

9. The process of claim 1 wherein the shaped units are partially dried with hot air convection ovens to retain said units' soft and wet texture and lower its water activity to below 0.85.

10. A process for making shaped grain products comprised of whole or pieces of soft and wet, cooked cereal grains joined together and microbiologically stable when stored at room temperature, said process comprising the steps of: a) modifying whole cereal grains; b) cooking the modified grains with a concentrated soluble solids solution and an anti-mycotic agent until said grains interiors become soft, wet, and translucent; c) enrobing the cooked grains with a binder; d) forming the grains into units with low shear forming equipment; and e) partially drying the shaped units to a water activity below 0.85.

* * * * *